(12) United States Patent
Teixeira de Abreu Pinho et al.

(10) Patent No.: US 12,299,398 B2
(45) Date of Patent: May 13, 2025

(54) TABLE COLUMN IDENTIFICATION USING MACHINE LEARNING

(71) Applicant: Dell Products L.P., Round Rock, TX (US)

(72) Inventors: Romulo Teixeira de Abreu Pinho, Niterói (BR); Paulo Abelha Ferreira, Rio de Janeiro (BR); Vinicius Gottin, Rio de Janeiro (BR); Pablo Nascimento Da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 635 days.

(21) Appl. No.: 17/586,529

(22) Filed: Jan. 27, 2022

(65) Prior Publication Data
US 2023/0237272 A1 Jul. 27, 2023

(51) Int. Cl.
*G06F 16/31* (2019.01)
*G06F 16/22* (2019.01)
*G06F 40/279* (2020.01)
*G06F 40/30* (2020.01)

(52) U.S. Cl.
CPC ............ *G06F 40/30* (2020.01); *G06F 40/279* (2020.01)

(58) Field of Classification Search
CPC ...... G06F 40/205; G06F 16/93; G06F 40/177; G06F 40/106; G06F 16/2228; G06F 40/10; G06F 40/284; G06F 16/316; G06F 40/30
See application file for complete search history.

(56) References Cited

U.S. PATENT DOCUMENTS

| 10,846,524 | B2* | 11/2020 | Price | G06V 30/416 |
| 11,200,413 | B2* | 12/2021 | Burdick | G06F 40/284 |
| 11,847,175 | B2 | 12/2023 | Ferreira | |
| 2004/0093355 | A1* | 5/2004 | Stinger | G06F 40/177 |
| 2014/0369602 | A1* | 12/2014 | Meier | G06V 30/412 |
| | | | | 382/182 |
| 2016/0104077 | A1* | 4/2016 | Jackson, Jr. | G06N 20/00 |
| | | | | 706/12 |

(Continued)

OTHER PUBLICATIONS

Aigner, Michael Benedikt. "Extraction of tabular information from PDF documents: a graph-based approach." PhD diss., Wien, 2020, pp. 1-126 (Year: 2020).*

*Primary Examiner* — Olujimi A Adesanya
(74) *Attorney, Agent, or Firm* — Krishnendu Gupta; Deepika Bhayana; Derek Lam

(57) ABSTRACT

Techniques are disclosed for predicting a table column using machine learning. For example, a system can include at least one processing device including a processor coupled to a memory, the processing device being configured to implement the following: determining a local word density for words in a table, the local word density measuring a count of other words in a first region surrounding the words; determining a local numeric density for the words, the local numeric density measuring a proportion of digits in a second region surrounding the words; determining semantic associations for the words by processing the words using an ML-based semantic association model trained based on surrounding words in nearby table columns and rows; and predicting a table column index for the words by processing the table using an ML-based table column model trained based on the local word density, local numeric density, and semantic association.

20 Claims, 8 Drawing Sheets

(56) References Cited

U.S. PATENT DOCUMENTS

| | | | |
|---|---|---|---|
| 2019/0102620 A1* | 4/2019 | Siddiq | G06F 16/24575 |
| 2019/0340240 A1* | 11/2019 | Duta | G06V 30/15 |
| 2020/0073878 A1* | 3/2020 | Mukhopadhyay | G06V 30/412 |
| 2020/0151444 A1* | 5/2020 | Price | G06V 30/416 |
| 2021/0240976 A1* | 8/2021 | Tiyyagura | G06V 30/414 |
| 2022/0318224 A1* | 10/2022 | Thompson | G06V 10/70 |
| 2022/0374426 A1* | 11/2022 | Thai | G06N 5/041 |
| 2023/0065915 A1* | 3/2023 | Berestovsky | G06V 30/1448 |
| 2023/0143568 A1* | 5/2023 | Asok | G06F 40/103 |
| | | | 704/9 |
| 2023/0237080 A1* | 7/2023 | Pinho | G06V 30/412 |
| | | | 706/16 |
| 2023/0274085 A1* | 8/2023 | Su | G06F 40/30 |
| | | | 704/9 |
| 2023/0359661 A1* | 11/2023 | Ferreira | G06F 16/345 |

* cited by examiner

| No | Product description | Qty | Un. Price | Total |
|---|---|---|---|---|
| 1 | Elongated golden-yellow banana | 2 | $10.00 | $20.00 |
| 2 | Perfectly round crimson-red apple | 6 | $5.00 | $30.00 |
| 3 | Juicy and tender sirloin beef | 1 | $50.00 | $50.00 |
| 4 | Scandinavian codfish | 1 | $100.00 | $100.00 |

Word: crimson-red
Neighbors: {description, golden-yellow, round, tender, ..., codfish, 2, 6, 1}
Local word density: 10

FIG. 3

| No | Product description | Qty | Un. Price | Total |
|----|---------------------|-----|-----------|-------|
| 1 | Elongated golden-yellow banana | 2 | $10.00 | $20.00 |
| 2 | Perfectly round crimson-red apple | 6 | $5.00 | $30.00 |
| 3 | Juicy and tender sirloin beef | 1 | $50.00 | $50.00 |
| 4 | Scandinavian codfish | 1 | $100.00 | $100.00 |

Word: crimson-red
Neighbors: {description, golden-yellow, round, tender, ..., codfish, 2, 6, 1}
Neighbor numeric density: {0, 0, 0, 0, ..., 0, 1, 1, 1}
Local numeric density: 0.7

FIG. 4

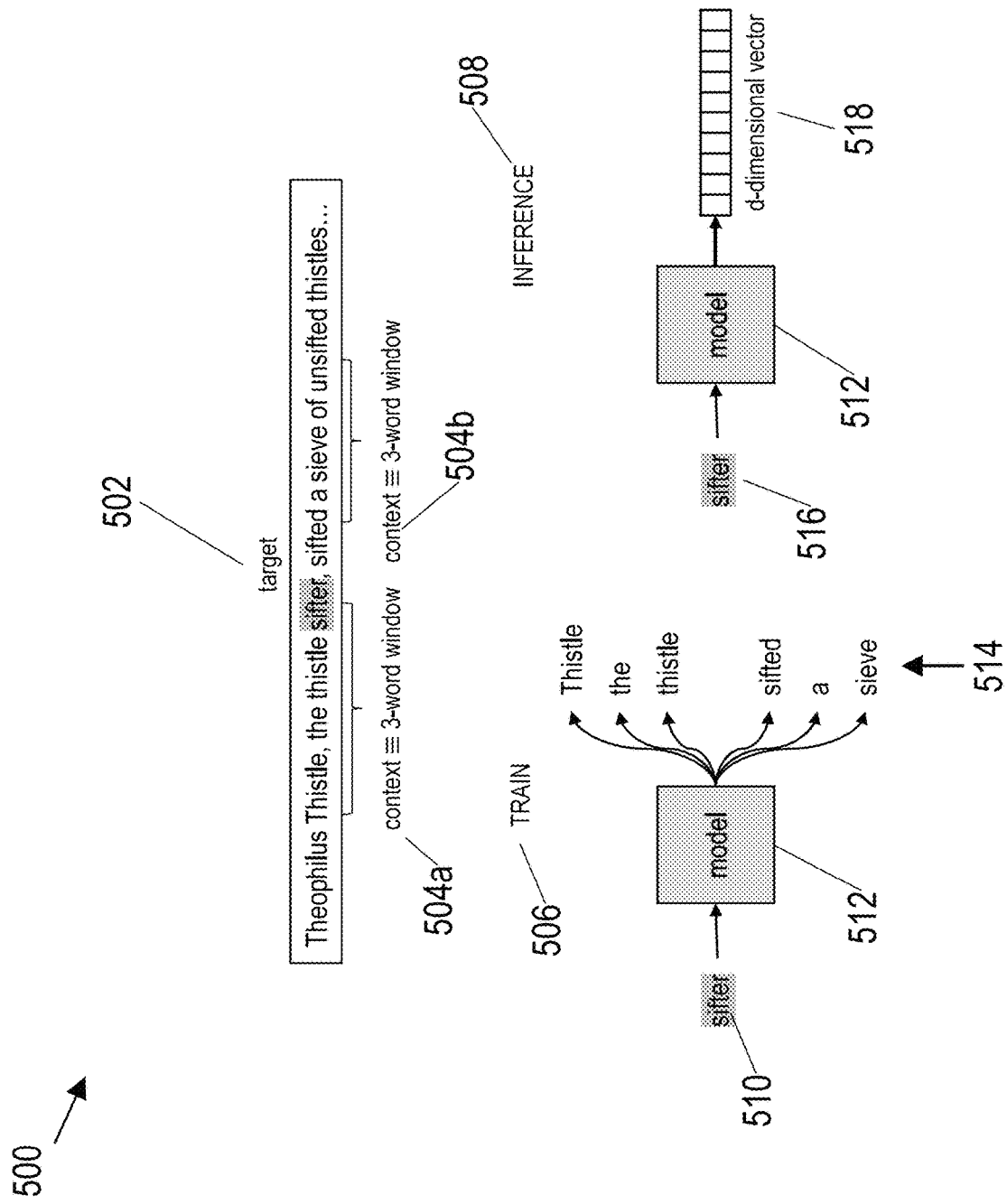

TABLE COLUMN IDENTIFICATION USING MACHINE LEARNING

RELATED APPLICATIONS

This application is related to: (1) U.S. patent application Ser. No. 17/586,494 (the '494 Application), entitled "TABLE ROW IDENTIFICATION USING MACHINE LEARNING;" and (2) U.S. patent application Ser. No. 17/649,136 (the '136 Application), entitled "PREDICTION OF TABLE COLUMN ITEMS IN UNSTRUCTURED DOCUMENTS USING A HYBRID MODEL." The contents of each aforementioned application, filed the same day herewith, are incorporated by reference herein in their entireties for all purposes.

FIELD

Embodiments of the present invention generally relate to information extraction from documents. More particularly, at least some embodiments relate to systems, hardware, software, computer-readable media, and methods for identifying table columns for words in a document using machine learning.

BACKGROUND

Extracting information from unstructured documents having intrinsic layout information (such as, for example, scanned documents or text-based PDFs), can implicate difficult data management problems. For example, it can be desirable to extract information from purchase orders received from customers so as to automate a portion of an order booking process for an enterprise. Additionally, some corporate standards and corporate policies can benefit from automated information extraction so as to promote the correct classification, labeling, and protection of data, documents, and emails.

SUMMARY

In one embodiment, a system comprises at least one processing device including a processor coupled to a memory, the at least one processing device being configured to implement the following steps: determining a local word density for one or more words in a table, wherein the local word density measures a count of other words in a first predetermined region surrounding the one or more words; determining a local numeric density for the one or more words, wherein the local numeric density measures a proportion of digits in a second predetermined region surrounding the one or more words; determining semantic associations for the one or more words by processing the one or more words using a machine learning (ML)-based semantic association model that is trained based on surrounding words in nearby columns and nearby rows of the table; and predicting a table column index for the one or more words by processing the table using an ML-based table column model that is trained based on the local word density, the local numeric density, and the semantic association for the one or more words in the table.

In some embodiments, the table column model can be further trained based on an error function that minimizes an error associated with determining a column transition based on an initial table column index for the one or more words. In addition, the table column model can be further trained based on a word position associated with each of the one or more words. In addition, the word position can be based on one or more coordinates corresponding to a bounding box associated with the each of the one or more words, and the one or more coordinates can be in a coordinate space associated with a document containing the table. In addition, the table column model can be a graph neural network (GNN) model. In addition, the local word density, the local numeric density, and the semantic association can be combined into a feature vector as input for training the GNN model. In addition, a difference in a table horizontal position and a difference in a table vertical position between two words sharing a graph edge can be combined into a subsequent feature vector as further input for training the GNN model. In addition, the processing device can be further configured to implement determining a table column for the one or more words based on the table column index. In addition, the table column index can be a real number, and the determining the table column can further comprise applying a rounding function to the table column index. In addition, the first predetermined region can be distinct from the second predetermined region.

Other example embodiments include, without limitation, apparatus, systems, methods, and computer program products comprising processor-readable storage media.

Other aspects of the invention will be apparent from the following description and the appended claims.

BRIEF DESCRIPTION OF THE DRAWINGS

The foregoing summary, as well as the following detailed description of exemplary embodiments of the invention, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

In the drawings:

FIG. 3 illustrates aspects of determining a local word density for words in accordance with example embodiments;

FIG. 4 illustrates aspects of determining a local numeric density for words in accordance with example embodiments;

FIGS. 5A-5B illustrate aspects of determining semantic associations for words in accordance with example embodiments;

DETAILED DESCRIPTION

Figure 1:
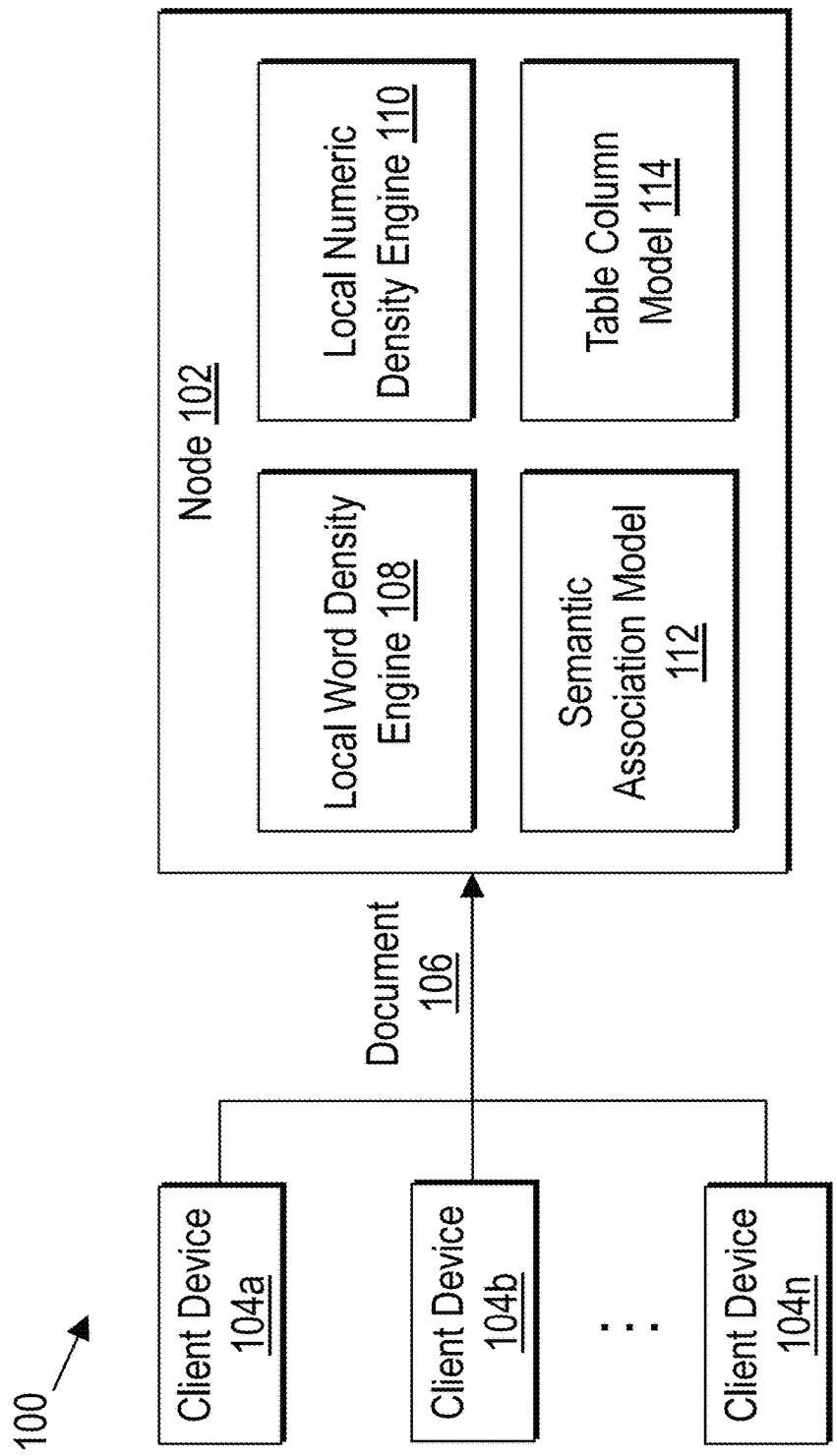
FIG. 1 illustrates aspects of an information extraction system in accordance with example embodiments.

Embodiments of the present invention generally relate to information extraction from documents. More particularly, at least some embodiments relate to systems, hardware, software, computer-readable media, and methods for identifying table columns for words in a document using machine learning.

Disclosed herein are example embodiments for identifying and extracting column items from documents, such as column items contained in tables of unstructured documents. More specifically, example embodiments are configured to apply an automatic method for extracting column items from tables in unstructured documents via a machine-learning-based table column model. Example embodiments discussed herein are configured to use a tailored set of features as input for the table column model to predict column indices of words in tables. For example, the table column model can be trained with word positions and spatial features that carry information both about word and table layout along with about inferring textual relationships between words, as discussed in further detail below.

The following includes a discussion of problems that may be resolved, or avoided, by example embodiments. This discussion is not intended, nor should be construed, to limit the scope of the invention in any way.

A technical problem involves data management relating to extracting information from unstructured documents with intrinsic layout information (e.g., scanned documents or text-based PDFs). For example, automated information extraction would be a useful technical solution to extract information from incoming purchase orders from customers so as to enable automating part of the order booking process. In another example, corporate standards and policies may impose requirements for correct classification, labeling and protection of data, documents, and emails. For example, existing information technology systems may impose a categorization according to well-defined rules based on the origin, destination, purpose, and content of the extracted information.

Both examples include specific information that would be beneficial to extract from documents. For example, in the purchase order domain, when a customer wishes to place an order for products, a purchase order document is generally received including all information regarding the list of products that the customer wish to buy, along with the delivering address, contact information, quote number, and the like. Certain enterprises may have internal processes whereby, for example, an employee reads the received document and manually checks if all the information is correct, which can be time-consuming. The technical solutions described herein are configured to automatically identify and extract a set of fields from unstructured documents to extract and/or understand and classify relevant parts of the document's content.

In particular, applicable technical problems addressed herein include list elements in unstructured documents (e.g., columns in a table for purchase orders). Example technical problems associated with information extraction from unstructured documents can include the following:

1. Automating the process of extracting line items from unstructured documents using, for example, machine learning
2. Table layout variability, since tables come in many shapes and formats
3. Open-ended word content, since all possible words that could be present in a table are unknowable
4. Unlimited number of items in associated lists: for instance, a system cannot know in advance the number of associated table columns to process; therefore, technical problems arise when processing a potentially unlimited number of elements (e.g., document words and table columns).

Table extraction in unstructured documents is a difficult research problem, often involving pre-processing steps, computer vision, and natural language processing. Identification of columns, in particular, is challenging because word locations have weak correlations with table column indices due to the variable number and location of columns in document tables. For this reason, conventional approaches often separately process the identification of table columns from the identification of table rows.

Technical solutions to these technical problems, such as the example embodiments disclosed herein, are configured to combine rule-based algorithms with machine learning, such as graph neural networks as discussed in further detail herein to classify elements with their correct table row.

Example embodiments discussed herein provide technical solutions to the technical problems articulated above. More specifically, example embodiments provide an automatic method for extracting column items (e.g., table columns) from unstructured documents.

Technical solutions to these technical problems, such as the example embodiments discussed herein, are configured to leverage spatial input features for use in a table column model for prediction of column indices of words in document tables. Advantageously, these features allow the present system to capture associated layout, format, and semantic characteristics of table words that more strongly correlate with the column index, in contrast to conventional approaches that process table columns based merely on the words' position in the tables. Example embodiments leverage the input features disclosed herein to be combined with a table column model, which are described in further detail below. Training and inference phases for the table column model are also discussed in further detail herein.

Digital transformation and artificial intelligence (AI) can greatly contribute to the area of data management. One important aspect of data management is document data management, where automatic digital processing can greatly improve efficiency and compliance. Data management can benefit from application of AI methods to data management when processing internal and customers' documents.

Information extraction from documents can improve data management techniques by allowing for automatic methods to understand, sort and process documents from different customers and documents pertaining to enterprises' internal processes. Enterprises can benefit greatly from having an automatic and low-cost method for obtaining this information to classify or extract content, for example to support process automation or compliance purposes of internal and customers' document data.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout this application, elements of figures may be labeled as 'a' to 'n'. As used herein, the aforementioned labeling means that the element may include any number of items and does not require that the element include the same number of elements as any other item labeled as 'a' to 'n'. For example, a data structure may include a first element labeled as 'a' and a second element labeled as 'n'. This labeling convention means that the data structure may include any number of the elements. A second data structure, also labeled as 'a' to 'n', may also include any number of elements. The number of elements of the first data structure and the number of elements of the second data structure may be the same or different.

Throughout the application, ordinal numbers (e.g., first, second, third, etc.) may be used as an adjective for an element (e.g., any noun in the application). The use of ordinal numbers is not to necessarily imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and a first element may encompass more than one element and succeed (or precede) the second element in an ordering of elements.

FIG. 1 shows aspects of an information extraction system in accordance with example embodiments. FIG. 1 illustrates an information extraction system 100 including a node 102 in communication with client devices 104a, 104b, . . . , 104n. The node is configured for extracting information from documents 106, as described in further detail below.

In example embodiments, the client devices 104a, 104b, . . . , 104n (sometimes referred to herein collectively as client devices 104) represent devices, a system of computers, a network, a datacenter, or the like. The client devices are configured to transmit one or more documents 106 to the node 102.

In example embodiments, the document 106 may be a data structure (e.g., a file) that includes data that may be used to perform services for users of the system 100 (e.g., clients). By way of example and not limitation, the document can include a purchase order, an inventory manifest, and other and/or additional types of documents without departing from the scope of the invention. The document is unstructured, meaning that the document is generally freeform and lacks a formal structure but is still able to be scanned or otherwise captured and imported into the information extraction system 100.

In example embodiments, the node 102 includes a local word density engine 108, a local numeric density engine 110, a semantic association model 112, and a table column model 114. The node is configured to communicate with the client devices 104, e.g., to receive one or more documents 106 for processing from a client device.

In example embodiments, the node 102 is configured to perform an automatic method for extracting column items, such as table column content, from unstructured documents.

The local word density engine 108 is configured to process the received document 106 and determine a local word density associated with words in a table of the document. In general, the local word density reflects a measure based on the number of words surrounding a given word in the table.

The local numeric density engine 110 is configured to process the received document 106 and determine a local numeric density associated with words in a table of the document. In general, the local numeric density reflects a measure based on the proportion of digits surrounding a given word in the table.

The semantic association model 112 is configured to process words in the received document 106 and determine a semantic association with words in a table of the document. In example embodiments, the semantic association model can be configured to output an embedding for the document words.

The table column model 114 is configured to process the received document 106 and predict a table column index for the words in a table of the document. In example embodiments, the table column model can be trained based on the local word density, the local numeric density, and the semantic associations for the words in the table.

Further details are provided below regarding training and inference phases for the respective machine-learning-based models 112, 114, where applicable.

It is to be appreciated that this particular arrangement of modules 108, 110, 112, 114 illustrated in the node 102 of the FIG. 1 embodiment is presented by way of example only, and alternative arrangements can be used in other embodiments. For example, the functionality associated with modules 108, 110, 112, 114 in other embodiments can be combined into a single module, or separated across a larger number of modules. As another example, multiple distinct processors and/or memory elements can be used to implement different ones of modules 108, 110, 112, 114 or portions thereof. At least portions of modules 108, 110, 112, 114 may be implemented at least in part in the form of software that is stored in memory and executed by a processor.

It is also to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the models disclosed herein to abstract concepts; instead, each model herein has a practical application in a processing device in the form of stored executable instructions and data that implement the model using the processing device.

Figure 2:
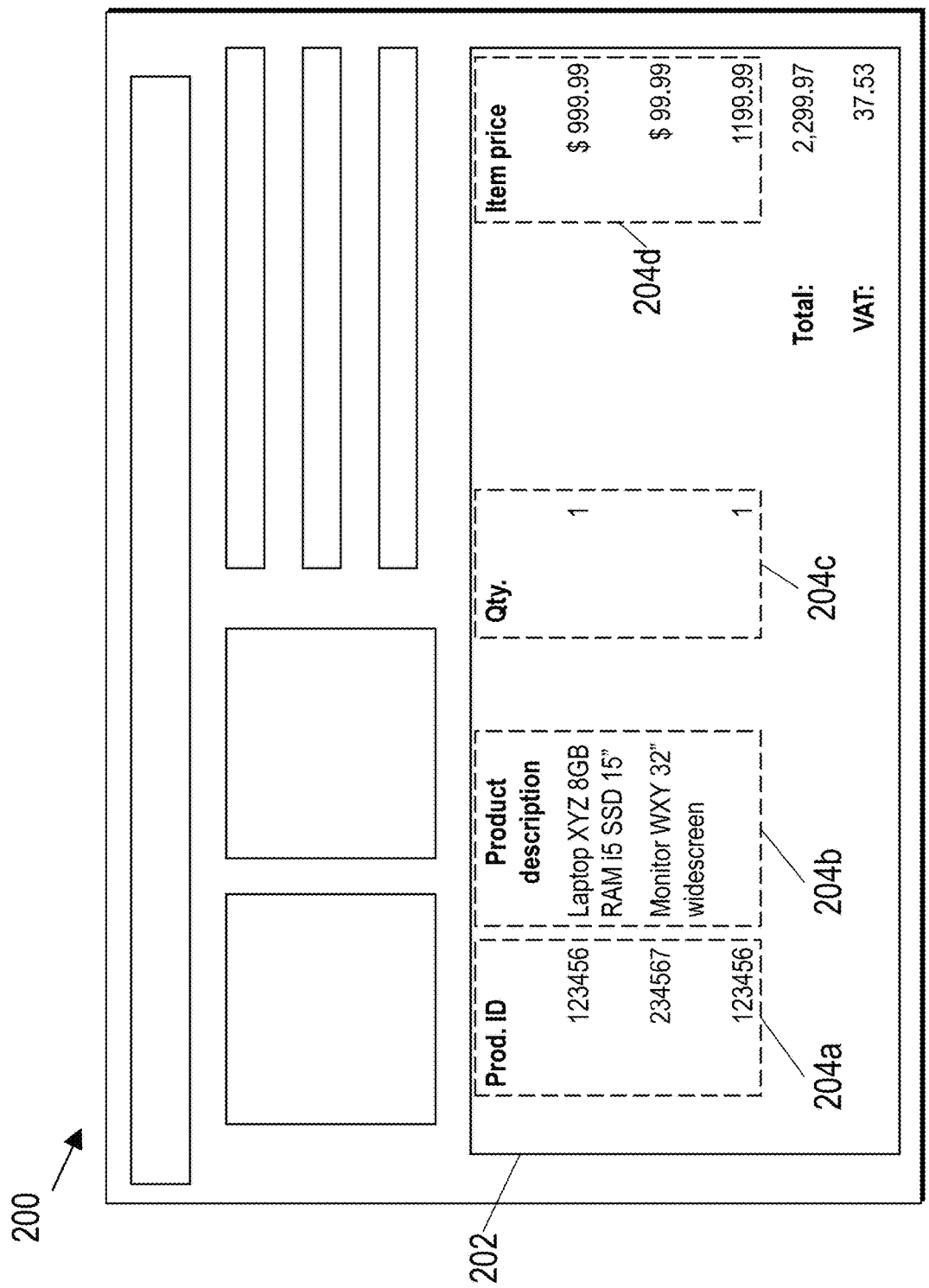
FIG. 2 illustrates aspects of an example document in accordance with example embodiments.

FIG. 2 shows aspects of a document in accordance with example embodiments. The document 200 (an example of the document 106 (FIG. 1)) includes an example table 202.

The document 200 may be, by way of example and not limitation, a purchase order of the type typically received by suppliers to indicate a customer order. The document may include training documents and live documents. Training documents may include documents that have been processed and are annotated with, for example, a reference to one or more field values of interest associated with the document. Training documents may be used to train and verify machine learning models, such as the semantic association model 112 and the table column model 114 (FIG. 1). Live documents may include documents that have not been processed and do not include a reference to the one or more fields values of interest associated with the document.

Table 202 can be contained in the document 200. In example embodiments, the present information extraction system is configured to extract column items, and example columns 204a, 204b, 204c, 204d containing column items may be found in tables such as the table 202.

In example embodiments, the present system is configured to leverage detected table regions (such as, e.g., a table body and a table header). The present system is also configured to leverage word positions associated with words inside the tables. For example, the word positions can include (x,y) coordinates for the words inside the tables, which confer information about the tables' layout. Any technique for detecting table regions and determining word positions can be used without departing from the scope of the invention. For example, techniques for detecting table regions and determining word positions can be carried out using one or more of the techniques disclosed in the '494 Application and the '136 Application.

It will be noted that the example document 200, table 202, and columns 204a, 204b, 204c, 204d illustrate some challenges common to documents in the problem domain of, for example, purchase orders: there can be information missing and/or misaligned (e.g., as seen in the second column 204b of the third row); the content may be unsorted and may repeat elements (e.g., as seen in the column 204a); and the content may contain formatting inconsistencies (e.g., as seen in the third row element of the column 204d which omits a dollar sign as a currency marker).

Accordingly, example embodiments are configured to process table content without assuming or requiring any fixed alignment between column content and header words. Example embodiments are operable in a manner that is robust against missing elements (e.g., product description for the same product) and robust against content or elements that might not be important to a domain expert (e.g., total and VAT). In contrast, conventional methods that rely on purely rule-based or rigid script-based approaches encounter difficulties when applied to documents to extract these types of information. Further, overall difficulties are not limited to the ones exemplified above. Documents may also exhibit issues with inconsistencies in formatting, sorting, and graphical representation of elements in the table, as illustrated in the example document 200 and the example table 202 of FIG. 2.

Example embodiments facilitate automated extraction of content in documents. However, layout variability makes automation challenging and often requires specialized and sophisticated systems for, e.g., field information extraction. In effect, despite the existence of commercial solutions addressing information extraction from documents, the problem remains open and is a subject of state-of-the-art research in intersections between computer vision and natural language processing.

Example embodiments of the present information extraction system are also configured to leverage labeled documents that may be available, e.g., in an annotated corpus or data set of documents such as tens, hundreds, thousands, tens or hundreds of thousands, millions of documents, or the like. Advantageously, example embodiments of the present information extraction system are accordingly applicable to domains where human annotation (e.g., labeling) of documents is current practice.

In addition to obtaining data that is annotated by humans using simple annotation tools, the data can also be obtained based on usage of document processing software. For example, example embodiments can be configured to match pre-processed documents to their associated processed information. Any of the above-described methods could serve as a source of labeled data for use by example embodiments of the present information extraction system. The set of documents for which the field information is known is sometimes referred to herein as annotated documents.

FIG. 3 shows aspects of determining a local word density for words in accordance with example embodiments. FIG. 3 illustrates processing an example table 300 (an example of the table 202 (FIG. 2)) to determine a local word density for an example word 302.

In example embodiments, the present system processes the word 302 to determine results 306, which can include a local word density for the word. As used herein, a "local word density" refers to a measure based on the number of words surrounding a given word in the table, such as the word 302. In some embodiments, the local word density can be a count of the number of words surrounding the target word.

In data sets with documents of the same type (e.g., purchase orders), it is reasonable, but not required herein, to expect that the type of information in and the layout of tables bear similarities across the data set. While the "global" layout of tables may differ, that is, the variable total number of columns and the variable absolute position of a column of a given type, one insight applicable to example embodiments of the present system is that the interrelation between table columns tends to be somewhat deterministic. For example, in connection with an example problem domain such as purchase orders, it is reasonable to expect that a "quantity" column follows a "product description" column, in the same way that a "total" column may follow a "unit price" column.

Intuitively, such interrelation between columns also confers information about the local density of words inside a table. With continued reference to the example illustrated in FIG. 3, it is reasonable to expect that a word inside a "product description" column (essentially, a text-based column) will be surrounded by more words than a word inside a "quantity" column (essentially, a column with short digit-based words).

Accordingly, example embodiments of the present system are configured to leverage such local word density information. To determine a local word density associated with each word 302 of a table 300, the present system is configured to use a predetermined radius and places a corresponding circle 304 at the center of the word 302. The present system is configured to count the number of words whose center falls within the circle, which can be used as the local word density of the given word. With reference to the example word 302, the results 306 illustrate the neighbors of the example word that fall within the example circle. Because there are ten neighbor words whose center falls within the example circle, the corresponding example local word density is determined as 10.

FIG. 4 shows aspects of determining a local numeric density for words in accordance with example embodiments. FIG. 4 illustrates processing an example table 400 (an example of the table 202 (FIG. 2)) to determine a local numeric density for an example word 402.

In example embodiments, the present system processes the word 402 to determine results 406, which can include a local numeric density for the word. As used herein, a "local numeric density" refers to a measure based on the proportion of digits surrounding a given word in the table, such as the word 402.

In example embodiments, the present system is configured to determine a local numeric density of a region around a given table word. An example region 404 and an example word 402 are illustrated in FIG. 4. The local numeric density generally represents an additional piece of information that may correlate with the table column type and, accordingly, the table column index of a column associated with a word.

As used herein, a "numeric density" refers to a measure of a proportion of digits in a given word. Put another way, the numeric density can represent the general concept that words in the same table column, especially words in tables that represent a list of items, can reasonably be expected to exhibit a similar format. Furthermore, such format, based on empirical observations, can often be related to the number of digits in the word. In example situations, a "product description" column may be primarily composed of words having more alphabetical characters than digits, while a "quantity" column may be primarily composed of numbers, and a "price" column may generally be composed of words at least having a currency symbol and decimal point. In some embodiments, the numeric density can be a real number between zero and one, indicating the proportion of digits in a word. For example, 0 can indicate that a word has no digits at all, and 1 can indicate a word consisting entirely of digits.

In example embodiments, the local numeric density of a word, then, can be used as a feature in a table column model indicating an average numeric density of a region surrounding a given word in a table. In some embodiments, the local numeric density can reflect words whose center coordinates fall inside the region 404 (such words are referred to in the results 406 as neighbors). In the example results 406, then, averaging together each neighbor numeric density for the ten neighbors yields an example local numeric density of 0.7. Similar to the local word density described previously in connection with FIG. 3, the local numeric density reflects an insight that words in the same column can be presumed or inferred to exhibit similar numeric characteristics. Advantageously, using such information assists the table column model in learning and inferring relationships between the local numeric density and associated table column indices.

FIG. 5A shows aspects of determining semantic associations for words in accordance with example embodiments. FIG. 5A illustrates an example approach 500 for using a semantic association model 512 to learn word associations from a corpus of text.

In example embodiments, the present information extraction system enhances existing natural language processing approaches for learning semantic associations (e.g., similarity) between words that are represented by numeric vectors. For example, the Word2vec algorithm is one approach to representing words in a given vocabulary such that the words can be used as input in machine learning models. In example embodiments, the enhanced algorithms disclosed herein are configured to transform words from their original variable sequence of characters into a list (e.g., a vector) of real numbers having a fixed, predefined dimensionality. Such transformation is also sometimes referred to as an embedding (e.g., a representation of association, similarity, or relation between the words). Determining semantic associations can be carried out, for example, using components and models such as further detailed below in connection with FIGS. 5A and 5B, and/or one or more of the techniques disclosed in T. Mikolov, K. Chen, G. Corrado, J. Dean, "Efficient Estimation of Word Representations in Vector Space," in International Conference on Learning Representations (ICLR), Scottsdale, 2013, which is incorporated by reference herein in its entirety for all purposes.

The conventional Word2vec algorithm reflects an intuition that words (such as the target word 502) that are synonyms usually appear surrounded by the same set of words (referred to as context 504a, 504b). As a result, target words that are synonyms should be encoded similarly in a given d-dimensional vector space. Such contextual similarity can even be verified, for example via a geometrical similarity function (e.g., cosine similarity) inside the embedded space.

Example embodiments of the present system are configured to leverage two implementation approaches for Word2vec. In the Continuous Bag of Words (CBOW) approach, a machine learning model, such as a semantic association model, is trained such that the most likely target word is predicted from a set of context words. In the Skip-gram approach, a machine learning model, such as a semantic association model, is trained such that the most likely set of context words is predicted from the target word. In both approaches, a window is defined to capture a given number of context words surrounding the target word in a linear sequence of text.

Figure 5B:
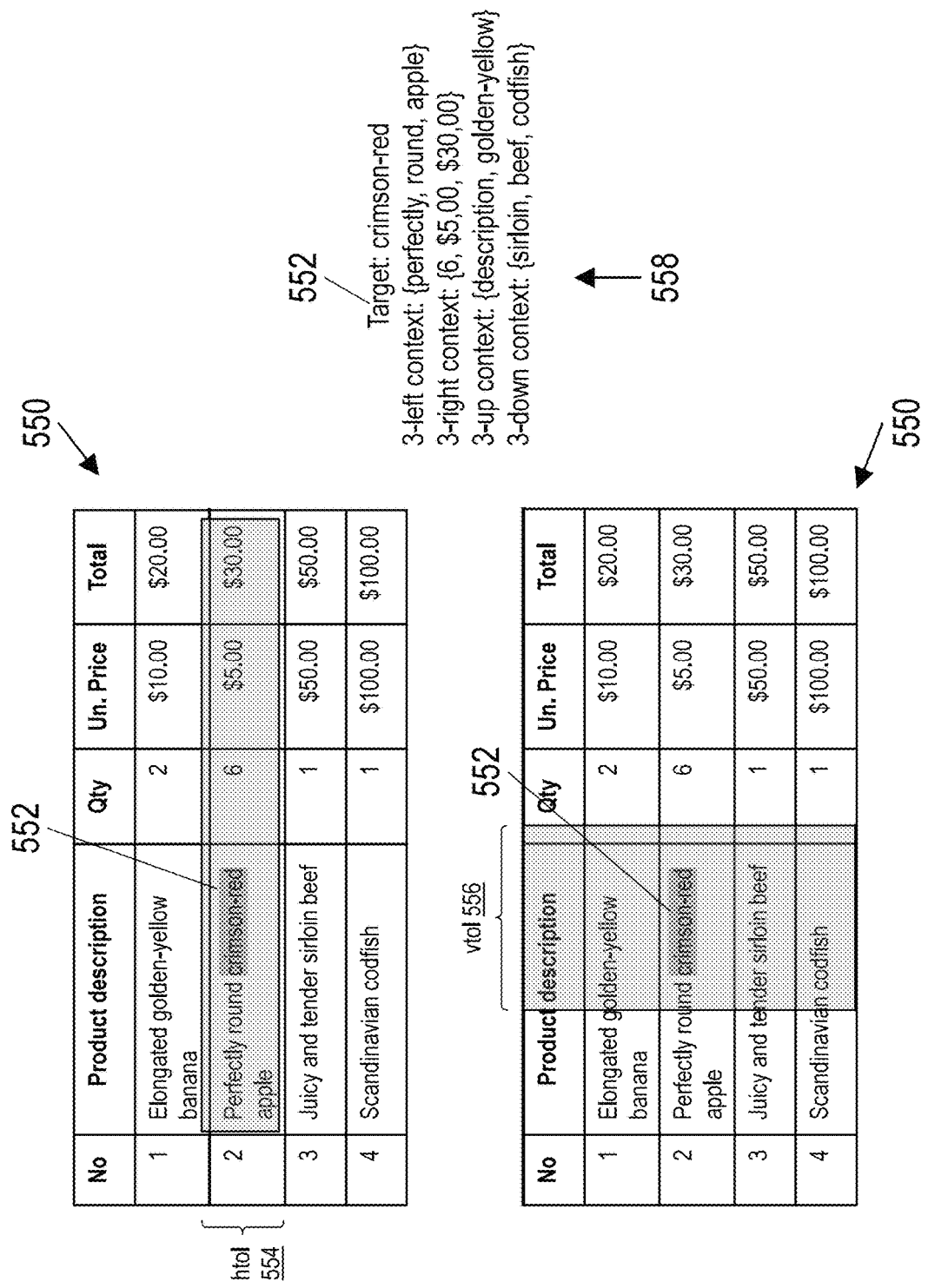

FIG. 5A generally illustrates the Skip-gram Word2vec approach in accordance with example embodiments. In a training phase 506, a machine learning model 512 is trained to predict surrounding context words 514 within a predefined window 504a, 504b of a given target word 502. For example, a context 504a, 504b can include a 3-word window preceding and succeeding a target word 502 which can be leveraged in the training phase 506. In an inference phase 508, the model 512 can be used to transform (e.g., embed) a target word 516 into a d-dimensional vector representation 518, which can be used as input for other machine learning models based on text, as discussed in further detail below in connection with FIG. 5B.

Although example enhancements to the Skip-gram model are discussed in further detail below in connection with FIG. 5B, the enhancements discussed herein are applicable to both modelling approaches (e.g., the Skip-gram and the CBOW approaches) without departing from the scope of the invention.

FIG. 5B shows aspects of determining semantic associations for words in accordance with example embodiments. FIG. 5B illustrates an example table 550 (an example of the table 202 (FIG. 2)) and extraction of target words and context words, such as example target word 552 and example context words 558.

In example embodiments, automatically identifying table columns associated with words in a table using an approach, such as the enhanced Word2vec algorithm, allows the present system to leverage spatial relationships among the words. For example, one spatial insight is that words in a column are typically semantically associated with words in the same column and with words in neighboring columns. This is especially the case in domain-specific tables, such as purchase order documents that can benefit from the example embodiments discussed herein. For example, a "product description" column can be expected to contain words from a vocabulary of possible product combinations. Similarly, an "amount" column can be expected to contain numbers indicating the amount of an ordered product item, for which reason it may be likely to be found as a neighbor column of "product description."

Example embodiments of the present system determine semantic associations for words by applying spatial relationships. One insight in connection with table columns is that, similar to the local word density and local numeric density discussed in connection with FIGS. 3 and 4, semantics and neighborhood apply not only to the surrounding words in reading order (e.g., horizontally left-to-right or right-to-left, depending on the applicable country), as is the case with conventional text. In fact, semantics and neighborhood apply both vertically as well as horizontally, in ways that are dependent on the layout of the tables. Accordingly, in some embodiments the present system enhances the conventional Word2vec approach to consider context words in both directions (e.g., vertical as well as horizontal), within the space of a document table so as to generate semantic associations (e.g., an associated embedding).

In example embodiments, one enhancement to a conventional Word2vec approach consists in defining the context window so as to capture the neighborhood of a table word in the horizontal and vertical directions. Example embodiments begin by obtaining a set of words inside a document table along with their associated word positions, e.g., so that such words are associated with their (x, y) coordinates relative to the origin of the table within the coordinate space of the document. For each target word, the present system is configured to select context words within a vertical and a horizontal window of predetermined sizes. One insight to this approach leverages the fact that table words are not necessarily aligned as in conventional texts. Thus, the example algorithm discussed in further detail below addresses this misalignment in both directions (e.g., the vertical as well as the horizontal direction). Once obtained, target and context words, respectively, can be provided as input and output for the semantic association model (e.g., the embedding model) in a similar way as in the conventional Word2vec algorithm.

The example algorithm below presumes availability of a list of records representing the words inside the table, each record having a {word, x, y} set of fields, where {x, y} represents the coordinates of the center of the word relative to the origin of the table. In example embodiments, the algorithm is implemented in two steps, in which the horizontal and vertical context words (neighbors) of a target word are obtained separately and concatenated at the end.

Although the example algorithm presented below provides one exemplary method, any approach for determining semantic associations for words can also be applied without departing from the scope of the invention:

```
1.function GetNeighbors(records, field_order, tol, window_size):
2.#records: list of words with their coordinates
3.#field_order: indicates whether we are processing vertical or horizontal neighbors
4.#tol: tolerance value to define neighborhoods
5.#window_size: number of context words before and after a target word
6.
7.# output sets
8. target = [ ]; context = [ ]
9.
10.#sort words according to field_order (horz or vert)
11.sorted_records = sort(records, by=field_order)
12.for rec in sorted_records:
13. # break each target word's record into its constituent fields considering the provided field_order
14. word_i = rec["word"]
15. loc_i0 = rec[field_order[0] ]
16. loc_i1 = rec[field_order[1] ]
17.
18. # find words within tol distance along the same field_order direction
19. tol_records = {srec | abs(srec[field_order[0] ] – loc_i0) < tol ∀ srec ϵ sorted_recrods}
20.
21. # find words before and after target word in orthogonal direction relative to field_order
22. words_before = {trec[0] | trec[field_order[1] ] < loc_i1 ∀ trec ϵ tol_records}
23. words_after = {trec[0] | trec[field_order[1] ] < loc_i1 ∀ trec ϵ tol_records}
24.
25. # filter words inside context window
26. words_before = words_before[-window_size:]
27. words_after = words_after[:window_size]
28.
29. # concatenate windows and assemble target and context sets
30. neighbors = concatenate(words_before, words_after)
31. for word_j in neighbors:
32.    target += word_i
33.    context += word_j
34.
35.return target, context
```

The function GetNeighbors is the part of the algorithm where neighbors of table words in a given direction are obtained. The algorithm is generic in the sense that its parameters define the neighborhood direction. In line 11, words are sorted by the given direction. For instance, if the present system is in the process of considering the horizontal direction, words are sorted in {y, x} order. Next, the present system is configured to loop through the sorted words, starting at line 12. For each wordi, and corresponding coordinates according to the processing direction, the present system is configured to filter out table words that fall outside a tolerance region around wordi across the processing direction (line 19). This is done in order to find words that are approximately on the same row (horizontal direction) or column (vertical direction) of the table, as illustrated in FIG. 5B. Now, the present system proceeds under a presumption that words form a linear sequence of text in either the horizontal or vertical direction. In lines 22 and 23, the present system is configured to find the words that surround wordi in the direction orthogonal to the processing direction. That is, for rows (e.g., {y, x} order), the present system is configured to search neighbors across the x direction; for columns (e.g., {x, y} order), the present system is configured to search neighbors across the y direction. After these two steps, the present system is configured to obtain the words_before and words_after sets relative to wordi. In lines 26 and 27, the present system is configured to filter out words falling outside the given search window. From line 30 onward, the present system is configured to concatenate the words_before and words_after sets and assemble the target and context sets for wordi. It will be noted that each target word wordi is associated with all neighbor words wordj. The function is configured to return the accumulated target and context sets of all words in the table.

In example embodiments, as mentioned above, advantageously the example algorithm consists of two steps so that vertical and horizontal neighborhoods are processed as expected. This the approach of the next function, GenerateSkipGrams, described in further detail below. Conceptually, the function receives as input all table words 552 in a dataset, grouped by document, a horizontal tolerance 554 and a vertical tolerance 556, and a window size. Then, for each document, the example algorithm is configured to retrieve all word records and calls the previous function to process them in horizontal and vertical orders, from lines 15 to 20. It will be noted that, advantageously, the processing order is defined solely by the field_order parameter. With the horizontal and vertical target 552 and context word sets 558, the only remaining action is to concatenate and accumulate them into lists containing target and context words for all documents. The example function returns the accumulated lists, which can then be processed as in the conventional Word2vec implementation.

Although the example function presented below provides one exemplary method, any function for processing surrounding words in nearby columns and nearby rows of the table can also be applied without departing from the scope of the invention:

```
1.function GenereateSkipGrams(words_by_document, htol, vtol, window_size):
2.#words_by_documen: list of words organized by document to be processed
3.#htol: horizontal tolerance to identify words in same row
4.#vtol: vertical tolerance to identify words in same column
5.#window_size: number of context words before and after a target word
6.#
7.# output sets
8. target = [ ]; context = [ ]
9.
10.# process the words of each document
11.for doc in words_by_document:
12.  records = doc["words", "x", "y"]
13.
14. # process word records horizontally (e.g., by row)
15. field_order = ["y", "x"]
16. th, ch = GetNeighbors(records, field_order, htol, window_size)
17.
18. # process word records vertically (e.g., by column)
19. field_order = ["x", "y"]
20. tv, cv = GetNeighbors(records, field_order, vtol, window_size)
21.
22. # concatenate horizontal and vertical neighbors into output sets
23. target += concatenate(th, tv)
24. context += concatenate(ch, cv)
25.
26.return target, context
```

Accordingly, semantic associations for words can be determined using, for example, spatial enhancements to a Word2vec algorithm such as the enhancements described above.

Example embodiments of the present system are configured to process an input table using a table column model based on the local word density, local numeric density, and the semantic associations. In example embodiments, the table column model can be a graph neural network (GNN) model. More specifically, the present system is configured to use the table column model to learn table column indices of each word inside a table of an unstructured document. The training and inference stages in connection with the table column model are discussed below.

A graph neural network (GNN) refers to a machine-learning-based model that receives as input a graph $\Gamma=(N, E)$ represented by a set of nodes, N, connected by edges, E.

Features H associated with the graph nodes at each layer, l, of the network are transformed via a function of the features of the neighboring nodes and edges in the graph in the previous layer. That is, $h_{i,l+1}=f(h_{i,l}, e_{j,i,l} \forall j \in \mathcal{N}(i))$, where $h_{i,l+1}$ refers to the features of node i at layer l+1, $h_{j,l}$ refers to the node features of the neighbors of node i at layer l, $e_{j,i,l}$ refers to the features of all incident edges of node i at layer l, and $\mathcal{N}(i)$ refers to the neighbors of node i. These successive transformations through multiple network layers generate an embedding of the nodes' features (e.g., a representation of similarity or relation between the nodes' features). The embedding can then be used as input for, e.g., classification or regression models.

In example embodiments, the present system is configured to use the table column model to learn the column indices of each word inside a table of an unstructured document. The input data for the model can comprise a fully connected graph whose nodes correspond to the words inside the table.

As node features, example embodiments of the present system are configured to combine (e.g., concatenate) the following values into a single feature vector, x, used as input for the table column model:

1. the x coordinate of the top-left corner of the bounding box of each word, which provides a notion of layout of the table;
2. the local word density of each word;
3. the local numeric density of each word;
4. the d-dimensional vector corresponding to the word's semantic association (e.g., embedding).

As edge features, example embodiments of the present system are configured to combine (e.g., concatenate) two values into a single feature vector, such as, for example, the (dx,dy) differences in horizontal and vertical positions in the table between the two words sharing the edge. Advantageously, these (dx,dy) differences also generally provide a notion of the layout of the table.

In example embodiments, the output of the table column model is a list of real numbers greater or equal to 0, one number for each input word (node). By having this flexible output, advantageously the present system can have an unbounded prediction on the table column assignment (e.g., starting at 0).

In a training phase, example embodiments of the present system are configured to train the table column model using annotated data where the column index of each word, e.g., the target variable, y, is known a priori. These column indices can be used as labels in a supervised learning procedure, where the aim is to learn the parameters, $\theta$, of a function $y=f(x|\theta)$ that minimizes an error between the values, $\hat{y}$, predicted by the table column model and the true values, y.

In example embodiments, the table column model is further trained using an error function configured to minimize an error associated with determining a column transition. In example embodiments, this prediction error is used as an element in the learning process. Accordingly, example embodiments of the present system are configured to combine two error functions, as follows:

$$\varepsilon(y,\hat{y})=L_1(y,\hat{y})+\text{ColSortErr}(y,\hat{y}).$$

The function $L_1(y,\hat{y})=|y-\hat{y}|$ refers to the conventional $L_1$ norm used in many settings and known to one having ordinary skill in the art.

Example embodiments of the present system are configured to supplement the $L_1$ norm with an additional error function ColSortErr($y,\hat{y}$). The error function is configured to leverage prior knowledge about a table's structure. Conceptually, if words in a table are sorted by their x coordinate, it is expected that words in the first table column will be the first, followed by the words in the second table column, followed by the words in the third table column, and so on. Numerically, table column indices of the sorted words will appear as a sequence, an example of which follows:

S=000 . . . 00001111 . . . 111122 . . . 222 . . . .

Example embodiments of the error function are configured to leverage a new generated sequence, S', based on the absolute difference between an element and the previous one, referred to here as SM. Accordingly, each table column transition will be marked with a 1 and all other elements will be 0, an example of which follows:

S'=000 . . . 00001000 . . . 000010 . . . 000 . . . .

In example embodiments, the sum of the elements of the sequence can be expected to be the total number of columns in the table minus one. Accordingly, in a perfect prediction by the table column model, such sum for the sorted sequences of y and $\hat{y}$ can be expected to be equal. In example embodiments, therefore, the function ColSortErr($y,\hat{y}$) can be defined as the following:

$$\text{ColSortErr}(y,\hat{y})=|\text{sum}(\delta(\text{sort\_colwise}(y)))-\text{sum}(\delta(\text{sort\_colwise}(\hat{y})))|$$

In example embodiments, during the training phase the annotated data is presumed to contain information about the true location and size of each table, along with the words it contains. Therefore, the table column indices used as targets refer to words inside the ground truth tables. In contrast, at inference time the ground truth column indices of the test cases are unknown (since these are the intended predictions using the table column model). Still, example embodiments of the present system begin with the location and size of the table, along with the words contained by the table, which information can be obtained by any known method, such as a predictive or manual process, without departing from the scope of the invention.

In example embodiments, in an inference phase the present system is configured to determine table column indices associated with a new (e.g., unannotated) input document, e.g. which was not part of the training set. The inference phase can include, but is not limited to, the following example steps:

1. Build a fully connected graph based on the words of the table and assemble the node and edge feature vectors of the graph based on the features used during training (e.g., {x, local_word_density, local_numeric_density, semantic_associations} as node features, and {dx,dy} as edge features).
2. Run the GNN model on the graph and obtain a prediction of the column index of each word in the table.

Figure 6:
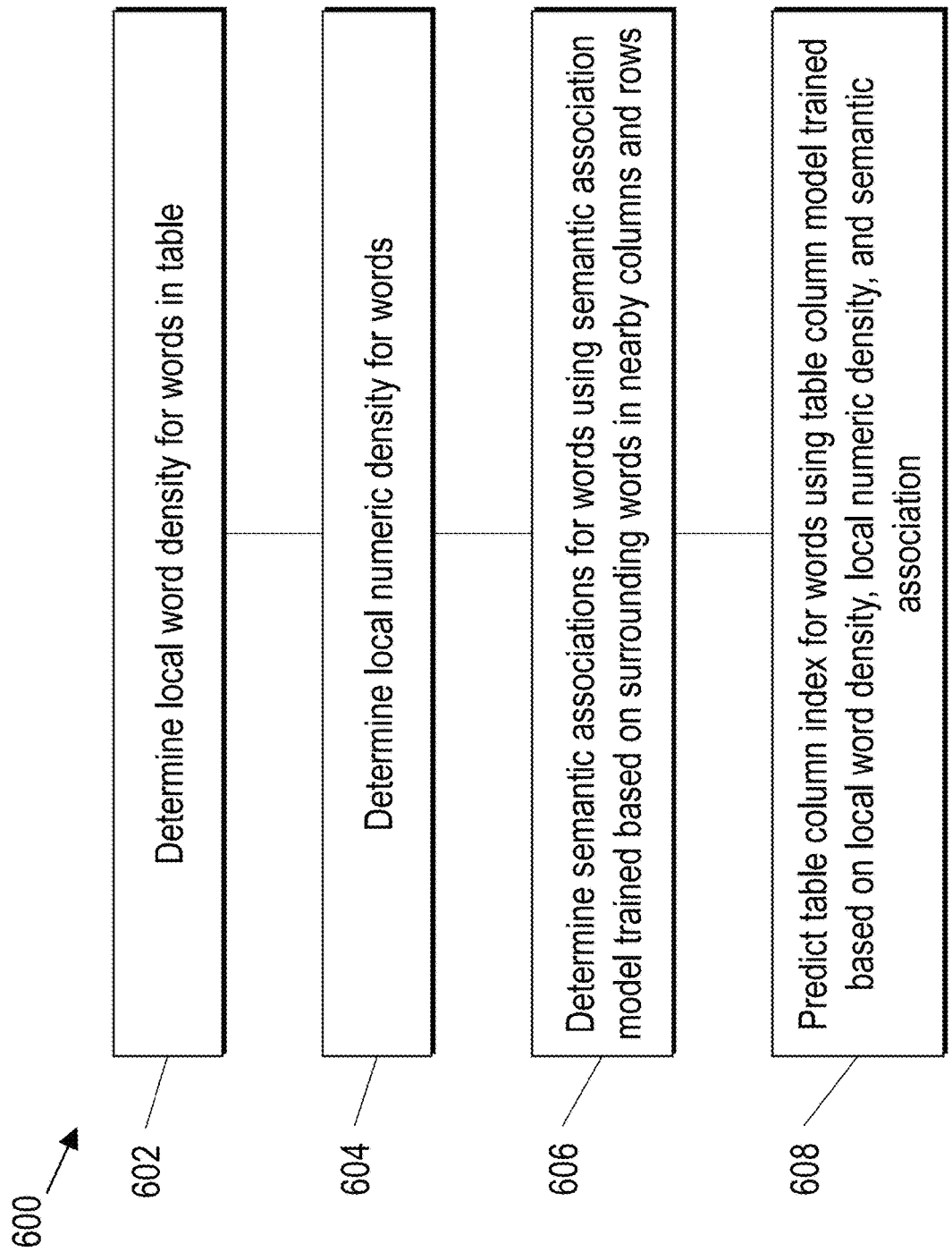
FIG. 6 illustrates aspects of a method for predicting a table column index in accordance with example embodiments.

FIG. 6 shows aspects of a method for predicting a table column index in accordance with example embodiments.

In example embodiments, the method 600 includes steps 602 through 608. These steps are assumed to be performed by the node 102 utilizing its elements 108, 110, 112, 114 (FIG. 1).

In example embodiments, the method 600 includes determining a local word density for words in a table (step 602). In some embodiments, the local word density can measure a count of other words in a predetermined region surrounding the words in the table. For example, the count can indicate a quantity of the other words whose word positions (e.g., center coordinates) are within a predetermined radius surrounding a word position for the word in the table.

In example embodiments, the method 600 includes determining a local numeric density for the words in the table (step 604). In some embodiments, the local numeric density can measure a proportion of digits in a predetermined region surrounding the words in the table. In some embodiments, the predetermined region for the local numeric density can be the same as the predetermined region for the local word density. In alternate embodiments, the predetermined region for the local numeric density can be distinct from the predetermined region for the local word density.

In example embodiments, the method 600 includes determining semantic associations for the words in the table using a semantic association model that is trained based on surrounding words in nearby columns and nearby rows of the table (step 606). In some embodiments, the semantic association model is a neural network model. In some embodiments, the surrounding words are determined based on a predetermined vertical tolerance reflecting the nearby columns and a predetermined horizontal tolerance reflecting the nearby rows.

In example embodiments, the method 600 includes predicting a table column index for the words in the table using a table column model that is trained based on the local word density, the local numeric density, and the semantic associations (step 608). In some embodiments, the table column model is further trained based on a word position associated with the words. In further embodiments, the word position is based on a coordinate corresponding to a bounding box associated with the each of the one or more words, and the coordinate is in a coordinate space associated with a document containing the table. In some embodiments, the table column model is further trained based on an error function that minimizes an error associated with determining a column transition based on an initial table column index for the one or more words. In some embodiments, the table column model is a GNN model. In some embodiments, the local word density, local numeric density, and semantic associations are combined into a feature vector as input for training the GNN model.

In example embodiments, the method 600 can further include determining a table column for the words in the table, based on the table column index. For example, the table column index can be a real number, and the determining the table column can include applying a rounding function to the table column index (e.g., to round the table column index up or down accordingly).

While the various steps in the method 600 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 600 of FIG. 6 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

As mentioned previously, at least portions of the information extraction system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 7. Although described in the context of system 100, these platforms may also be used to implement at least portions of other information processing systems in other embodiments.

Figure 7:
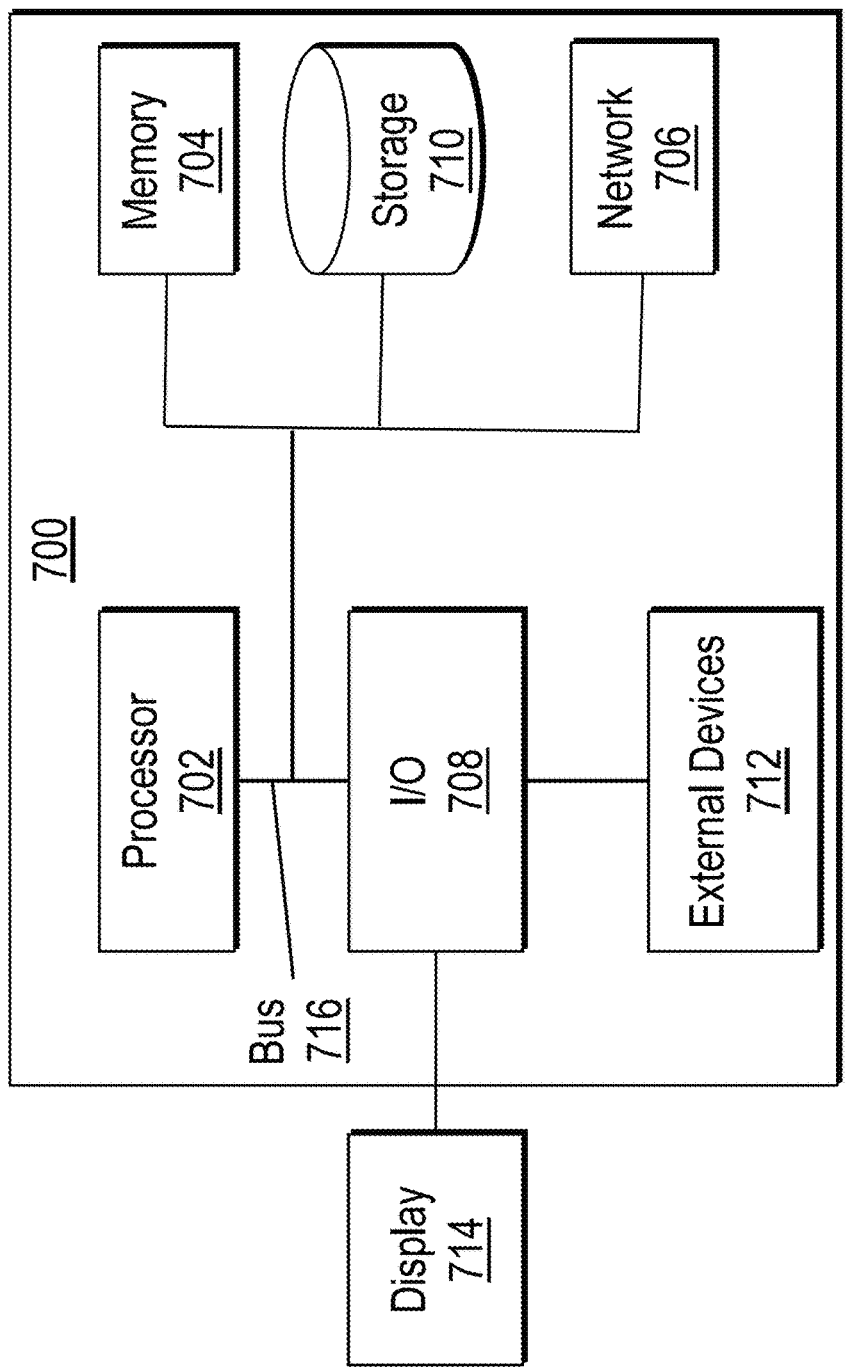
FIG. 7 illustrates aspects of a computing device or computing system in accordance with example embodiments.

FIG. 7 shows aspects of a computing device or a computing system in accordance with example embodiments. The computer 700 is shown in the form of a general-purpose computing device. Components of the computer may include, but are not limited to, one or more processors or processing units 702, a memory 704, a network interface 706, and a bus 716 that communicatively couples various system components including the system memory and the network interface to the processor.

The bus 716 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 700 typically includes a variety of computer-readable media. Such media may be any available media that is accessible by the computer system, and such media includes both volatile and non-volatile media, removable and non-removable media.

The memory 704 may include computer system readable media in the form of volatile memory, such as random-access memory (RAM) and/or cache memory. The computer system may further include other removable/non-removable, volatile/non-volatile computer system storage media. By way of example only, the storage system 710 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 716 by one or more data media interfaces. As has been depicted and described above in connection with FIGS. 1-6, the memory may include at least one computer program product having a set (e.g., at least one) of program modules that are configured to carry out the functions of the embodiments as described herein.

The computer 700 may also include a program/utility, having a set (at least one) of program modules, which may be stored in the memory 704 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 700 may also communicate with one or more external devices 712 such as a keyboard, a pointing device, a display 714, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 708. Still yet, the computer system may communicate with one or more networks such as a local area network (LAN), a general wide area network (WAN), and/or a public network (e.g., the Internet) via the network adapter 706. As depicted, the network adapter communicates with the other components of the computer system via the bus 716. It should be understood that although not shown, other hardware and/or software components could be used in conjunction with the computer system. Non-limiting examples include microcode, device drivers, redundant processing units, external disk drive arrays, Redundant Array of Independent Disk (RAID) systems, tape drives, data archival storage systems, etc.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the invention should be limited only by the appended claims.

What is claimed is:

1. A system comprising:
   at least one processing device including a processor coupled to a memory;
   the at least one processing device being configured to implement the following steps:
      determining a local word density for one or more words in a table in a document, wherein the local word density measures a count of other words in a first predetermined region surrounding the one or more words;
      determining a local numeric density for the one or more words, wherein the local numeric density measures a proportion of digits in a second predetermined region surrounding the one or more words;
      determining semantic associations for the one or more words by processing the one or more words using a machine learning (ML)-based semantic association model that is trained based on surrounding words in nearby columns and nearby rows of the table;
      predicting a table column index for the one or more words by processing the table using an ML-based table column model that is trained based on the local word density, the local numeric density, and the semantic association for the one or more words in the table;
      using the predicted table column index to determine a table column for the one or more words; and
      using the semantic associations to automatically extract a plurality of the words from the table column in the document.

2. The system of claim 1, wherein the table column model is further trained based on an error function that minimizes an error associated with determining a column transition based on an initial table column index for the one or more words.

3. The system of claim 1, wherein the table column model is further trained based on a word position associated with each of the one or more words.

4. The system of claim 3, wherein the word position is based on one or more coordinates corresponding to a bounding box associated with the each of the one or more words, and wherein the one or more coordinates are in a coordinate space associated with a document containing the table.

5. The system of claim 1, wherein the table column model is a graph neural network (GNN) model.

6. The system of claim 5, wherein the local word density, the local numeric density, and the semantic association are combined into a feature vector as input for training the GNN model.

7. The system of claim 6, wherein a difference in a table horizontal position and a difference in a table vertical position between two words sharing a graph edge are combined into a subsequent feature vector as further input for training the GNN model.

8. The system of claim 1,
   wherein the table column index is a real number, and
   wherein the table column is determined by applying a rounding function to the table column index.

9. The system of claim 1, wherein the first predetermined region is distinct from the second predetermined region.

10. The system of claim 1, wherein:
    the documents include purchase orders, and
    the processor is further configured to implement:
       processing the extracted words from the purchase orders to implement a portion of an order booking process.

11. A method comprising:
    determining a local word density for one or more words in a table, wherein the local word density measures a count of other words in a first predetermined region surrounding the one or more words;
    determining a local numeric density for the one or more words, wherein the local numeric density measures a proportion of digits in a second predetermined region surrounding the one or more words;
    determining semantic associations for the one or more words by processing the one or more words using a machine learning (ML)-based semantic association model that is trained based on surrounding words in nearby columns and nearby rows of the table;
    predicting a table column index for the one or more words by processing the table using an ML-based table column model that is trained based on the local word density, the local numeric density, and the semantic association for the one or more words in the table;
    using the predicted table column index to determine a table column for the one or more words; and
    using the semantic associations to automatically extract a plurality of the words from the table column in the document.

12. The method of claim 11, wherein the table column model is further trained based on an error function that minimizes an error associated with determining a column transition based on an initial table column index for the one or more words.

13. The method of claim 11, wherein the table column model is further trained based on a word position associated with each of the one or more words, wherein the word position is based on one or more coordinates corresponding to a bounding box associated with the each of the one or more words, and wherein the one or more coordinates are in a coordinate space associated with a document containing the table.

14. The method of claim 11, wherein the table column model is a graph neural network (GNN) model.

15. The method of claim 14, wherein the local word density, the local numeric density, and the semantic association are combined into a feature vector as input for training the GNN model.

16. The method of claim 15, wherein a difference in a table horizontal position and a difference in a table vertical position between two words sharing a graph edge are combined into a subsequent feature vector as further input for training the GNN model.

17. The method of claim 11,
wherein the table column index is a real number, and
wherein the table column is determined by applying a rounding function to the table column index.

18. The method of claim 11, wherein the first predetermined region is distinct from the second predetermined region.

19. The method of claim 11, further comprising:
processing the extracted words to implement a data policy for data classification, data labeling, and data protection.

20. A non-transitory processor-readable storage medium having stored therein program code of one or more software programs, wherein the program code when executed by at least one processing device causes the at least one processing device to perform the following steps:
determining a local word density for one or more words in a table, wherein the local word density measures a count of other words in a first predetermined region surrounding the one or more words;
determining a local numeric density for the one or more words, wherein the local numeric density measures a proportion of digits in a second predetermined region surrounding the one or more words;
determining semantic associations for the one or more words by processing the one or more words using a machine learning (ML)-based semantic association model that is trained based on surrounding words in nearby columns and nearby rows of the table;
predicting a table column index for the one or more words by processing the table using an ML-based table column model that is trained based on the local word density, the local numeric density, and the semantic association for the one or more words in the table;
using the predicted table column index to determine a table column for the one or more words; and
using the semantic associations to automatically extract a plurality of the words from the table column in the document.

* * * * *